United States Patent
Schoenbrun et al.

(10) Patent No.: US 10,146,933 B1
(45) Date of Patent: Dec. 4, 2018

(54) ACCESS CONTROL USING PASSWORDS DERIVED FROM PHRASES PROVIDED BY USERS

(71) Applicant: EMC IP Holding Company LLC, Hopkinton, MA (US)

(72) Inventors: Yihezkel Schoenbrun, Raanana (IL); Julia Roschak, Raanana (IL); Itzik Sorani, Kadima (IL); Tamar Vardy, Tel Aviv (IL); Haim Raman, Netanya (IL); Mikael Peres, Raanana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 194 days.

(21) Appl. No.: 15/193,364

(22) Filed: Jun. 27, 2016

(51) Int. Cl.
| | |
|---|---|
| *G06F 21/00* | (2013.01) |
| *G06F 21/46* | (2013.01) |
| *G06F 21/31* | (2013.01) |
| *H04L 29/06* | (2006.01) |
| *H04W 12/06* | (2009.01) |
| *H04W 12/08* | (2009.01) |

(52) U.S. Cl.
CPC .............. *G06F 21/46* (2013.01); *G06F 21/31* (2013.01); *H04L 63/083* (2013.01); *H04L 63/10* (2013.01); *H04W 12/06* (2013.01); *H04W 12/08* (2013.01)

(58) Field of Classification Search
None
See application file for complete search history.

(56) References Cited

U.S. PATENT DOCUMENTS

| | | | |
|---|---|---|---|
| 9,154,480 B1 | 10/2015 | Juels | |
| 9,160,744 B1 | 10/2015 | Machani | |
| 9,177,123 B1 | 11/2015 | Farquhar | |
| 9,235,715 B1 | 1/2016 | Bailey et al. | |
| 9,239,916 B1 | 1/2016 | Bailey | |
| 9,280,871 B2 | 3/2016 | Bailey et al. | |
| 9,407,441 B1 | 8/2016 | Dotan et al. | |
| 9,607,139 B1 | 3/2017 | Machani | |
| 9,641,489 B1 | 5/2017 | Kaufman et al. | |
| 9,673,979 B1 | 6/2017 | Poole | |
| 9,774,586 B1 | 9/2017 | Roche et al. | |
| 2002/0133707 A1* | 9/2002 | Newcombe | A63F 13/12 713/183 |
| 2005/0071686 A1* | 3/2005 | Bagga | G06F 21/46 726/19 |

* cited by examiner

*Primary Examiner* — William J. Goodchild
(74) *Attorney, Agent, or Firm* — BainwoodHuang

(57) ABSTRACT

A technique controls access to a resource. The technique includes deriving, by processing circuitry, a password based on a phrase/thought provided by a user. The technique further includes confirming with the user that the password is to control access to the resource. The technique further includes, after confirming with the user that the password is to control access to the resource, imposing a requirement that the user provide the password before obtaining access to the resource. Such a password may be formed by concatenating multiple words (e.g., four words) that may be unrelated to each other. Such a password may be relatively strong since the resulting concatenation would not be found in any dictionary, and since it would be an extremely difficult and time consuming endeavor to predict such a password by attempting to combine words from a dictionary to form the concatenations.

20 Claims, 5 Drawing Sheets

ACCESS CONTROL USING PASSWORDS DERIVED FROM PHRASES PROVIDED BY USERS

BACKGROUND

User authentication involves a user providing a current password to an authentication server. The authentication server then compares the current password to an expected password to determine whether the user is the legitimate user or a fraudster (i.e., a malicious person posing as the legitimate user).

A typical password may be a word or a statement such as "goyankees". A more complicated password may have one or more characters of the word or statement substituted with a number or a metacharacter such as "g0y@nk3e$".

SUMMARY

Unfortunately, there are deficiencies to the above described typical passwords and more complicated passwords. Alone these lines, a password that is a word or a statement (e.g., "goyankees") may be relatively easy to guess. If fact, most of these types of passwords may be found in a dictionary or a table of common statements.

Additionally, substituting characters with metacharacters (e.g., "g0y@nk3e$") is easy to predict. For example, it is relatively straightforward to see that "0" is a substitute for "o", "$" is a substitute for "s", "+" is a substitute for "t", and so on. Accordingly, the basic swapping of characters with metacharacters is not an effective approach to password strengthening.

In contrast to the above described typical passwords which use words or simple statements and more complicated passwords which include characters substituted with metacharacters, improved techniques are directed to access control using passwords derived from phrases (or thoughts) provided by users. In particular, such a phrase from a user may operate as a source of multiple words from which a password is generated. For example, four words can be selected from the phrase and four alternative words can be derived from the original four words. The four alternative words can then be concatenated to form the password. Such a password is relatively strong since the resulting concatenation would not be found as an entry in any dictionary, and since it would be an extremely difficult and time consuming endeavor to predict such passwords by attempting to combine words from a dictionary to form the concatenations. Moreover, such a password would not be difficult for the user to remember since the user provided the original phrase from which the password was derived.

One embodiment is directed to a method of controlling access to a resource. The method includes deriving, by processing circuitry, a password based on a phrase provided by a user. The method further includes, by the processing circuitry, confirming with the user that the password is to control access to the resource. The method further includes, after confirming with the user that the password is to control access to the resource, imposing, by the processing circuitry, a requirement that the user provide the password before obtaining access to the resource.

In some arrangements, deriving the password based on the phrase provided by the user includes prompting the user to type in the phrase, extracting a first group of words from the phrase, modifying at least some of the words in the first group of words extracted from the phrase to generate a second group of words, and providing the second group of words to the user.

In some arrangements, prompting the user to type in the phrase includes instructing the user to write, as the phrase, an expression regarding a particular subject. Along these lines, prompting the user to type in the phrase may further include, prior to instructing the user to write the expression, randomly selecting the particular subject from multiple subjects in a subject database and presenting the particular subject on an electronic display to the user.

In some arrangements, extracting the first group of words from the phrase includes parsing the phrase into individual words, and selecting, as the first group of words, less than all of the individual words parsed from the phrase. Here, selecting less that all of the individual words may include identifying, as the first group of words, a predefined number of uncommon words from the individual words parsed from the phrase.

In some arrangements, identifying the predefined number of uncommon words from the individual words parsed from the phrase includes scoring each individual word parsed from the phrase based on a word preference database. Additionally, identifying further includes selecting, as the first group of words, four words from the individual words parsed from the phrase based on scoring each individual word.

In some arrangements, modifying at least some of the words in the first group of words includes adjusting letters in words of the first group of words to form the second group of words. Here, adjusting the letters in the words of the first group of words may include, for each word of the first group of words, making an adjustment to exactly one letter in that word to form a new word that is different from that word. The new word is included in the second group of words.

In some arrangements, adjusting the letters in the words of the first group of words includes replacing exactly one letter with another letter in a particular word of the first group of words to form a particular word of the second group of words.

In some arrangements, adjusting the letters in the words of the first group of words includes deleting exactly one letter from a particular word of the first group of words to form a particular word of the second group of words.

In some arrangements, adjusting the letters in the words of the first group of words includes adding exactly one letter to a particular word of the first group of words to form a particular word of the second group of words.

In some arrangements, providing the second group of words to the user for password use includes displaying, as a proposal for the password, each word of the second group of words on an electronic display to the user, the proposal for the password including at least 16 letters. Here, displaying each word of the second group of words may include presenting, on the electronic display to the user, a concatenated string of letters, the concatenated string including each word of the second group of words.

In some arrangements, confirming with the user that the password is to control access to the resource includes prompting the user to approve the password as an authentication factor for authentication of the user and, in response, receiving an electronic signal approving the password as an authentication factor for authentication of the user. Along these the user may agree to use the proposed password, or repeat the process (e.g., enter another phrase to generate a different password, etc.).

In some arrangements, imposing the requirement that the user provide the password before obtaining access to the resource includes:

(i) querying the user for the password and, in response, receiving input from the user, (ii) performing an authentication operation based on the input from the user, (iii) granting resource access to the user when a result of the authentication operation indicates that the user is authentic, and (iv) denying resource access to the user when the result of the authentication operation does not indicate that the user is authentic.

Another embodiment is directed to electronic circuitry that controls access to a resource. The electronic circuitry includes memory and control circuitry coupled to the memory. The memory stores instructions which, when carried out by the control circuitry, cause the control circuitry to:

(A) derive a password based on a phrase provided by a user, (B) confirm with the user that the password is to control access to the resource, and (C) after confirming with the user that the password is to control access to the resource, impose a requirement that the user provide the password before obtaining access to the resource.

Yet another embodiment is directed to a computer program product having a non-transitory computer readable medium which stores a set of instructions to control access to a resource. The set of instructions, when carried out by computerized circuitry, causing the computerized circuitry to perform a method of:

(A) deriving a password based on a phrase provided by a user;

(B) confirming with the user that the password is to control access to the resource; and (C) after confirming with the user that the password is to control access to the resource, imposing a requirement that the user provide the password before obtaining access to the resource.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in access control using passwords derived from phrases provided by users.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to access control using a password derived from a phrase (or thought) provided by a user. In particular, such a phrase may operate as a source of multiple words from which the password is generated. For example, four words can be selected from the phrase and four other words can be derived from the original four words (e.g., by adjusting a letter). These four other words can then be concatenated to form the password. Such a password is relatively strong since the resulting concatenation would not be found in any dictionary, and since it would be an extremely difficult and time consuming endeavor to predict such passwords by attempting to combine words from a dictionary to form the concatenations. Moreover, such a phrase-derived password would not be difficult for the user to remember since the user provided the original phrase from which the password was derived.

Figure 1:
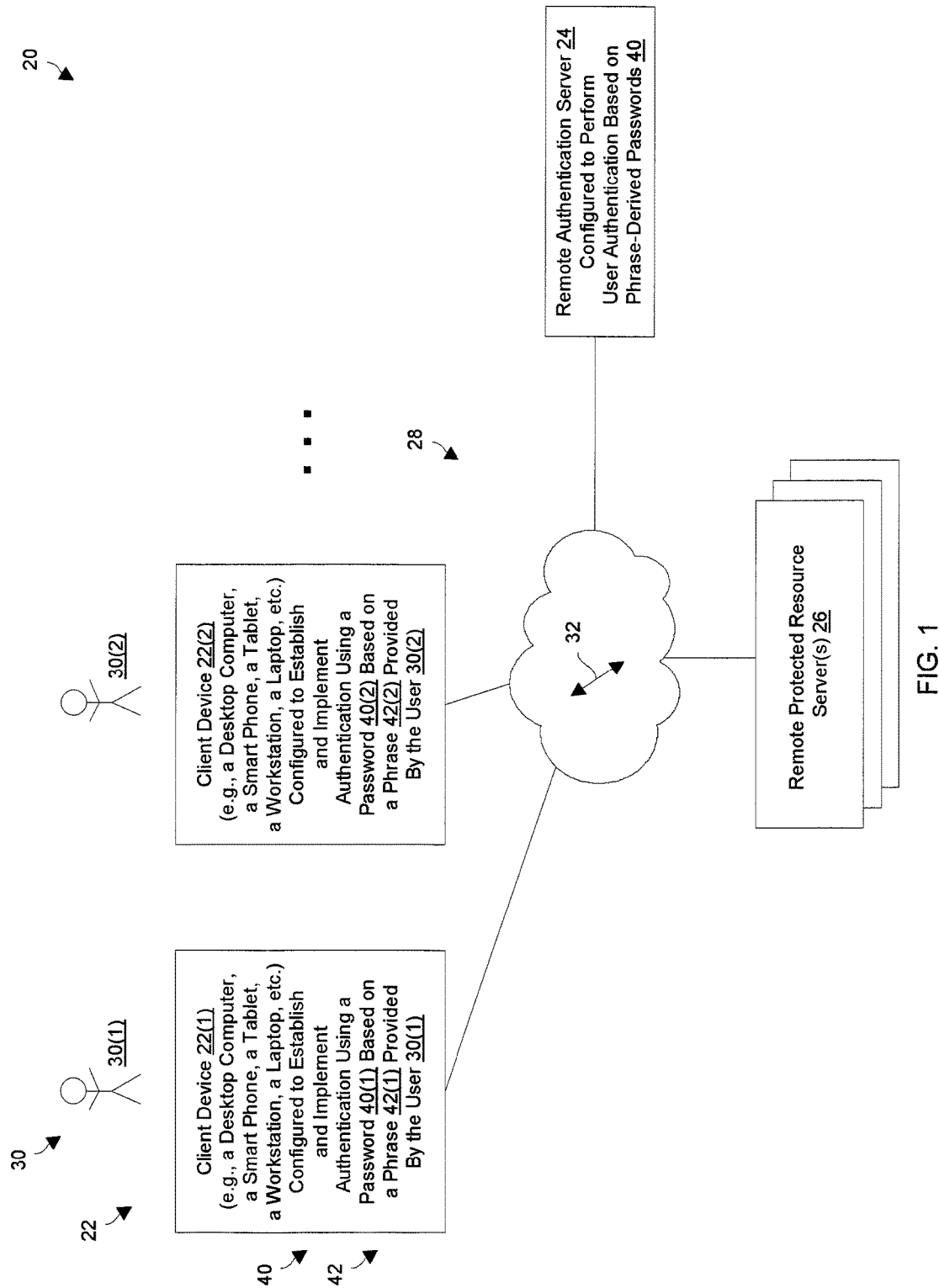
FIG. 1 is a block diagram of an electronic environment provides access control using passwords derived from phrases provided by users.

FIG. 1 shows an electronic environment 20 which provides access control using passwords derived from phrases provided by users. Such phrase-derived passwords can be used for user authentication to access local computerized resources and/or remote computerized resources.

As shown in FIG. 1, the electronic environment 20 includes client devices 22(1), 22(2), . . . (collectively, client devices 22), a remote authentication server 24, a set of remote protected resource servers 26, and a communications medium 28. The electronic environment 20 may include other electronic devices as well (e.g., an electronic device of a malicious person).

Each client device 22 is constructed and arranged to control access to a set of computerized resources on behalf of a respective user 30 so that the user 30 is able to perform useful work. Along these lines, the client device 22(1) controls access for a user 30(1), the client device 22(2) controls access for another user 30(2), and so on. Suitable form factors for the client devices 22 include desktop computers, workstations, smart phones, tablets, personal digital assistants (PDAs), laptop computers, specialized devices, etc. which are equipped with user interfaces for user input/output (I/O), e.g., electronic displays, keyboards and mice, touchscreens, etc.

It should be understood that user authentication to unlock access to a set of computerized resources may performed completely locally (i.e., entirely by a client device 22), or involve the remote authentication server 24 (i.e., where at least a portion of the authentication process is performed at the remote authentication server 24). In some arrangements, a user 30 must successfully authenticate with a password manager using a phrase-derived password (e.g., via a single sign-on) which then provides credentials for unlocking one or more other accounts, privileges, other types of resources, combinations thereof, etc.

The remote authentication server 24 is constructed and arranged to remotely authenticate users of the mobile devices 22 as needed. Such authentication may involve comparing current authentication factor to expected authentication factors, comparing current user behavior to expected user behavior, generating risk scores indicating the likelihood that the users are fraudsters, combinations thereof, and so on. The remote authentication server 24 may communicate directly with the client devices 22, or indirectly with the client devices 22 through one or more remote protected resource servers 26 (e.g., when a remote protected resource server 26 requires authentication of a user 30).

The set of remote protected resource servers 26 represent external electronic equipment which may communicate with the client devices 22 and/or the remote authentication server 24. Each remote protected resource server 26 is capable of providing, to a user 30, access to one or more computerized resources.

The communications medium 28 is constructed and arranged to connect the various components of the electronic environment 20 together to enable these components to exchange electronic signals 32 (e.g., see the double arrow 32). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, combinations thereof, etc.

During operation, the users 30 authenticate using the client devices 22 in order to access computerized resources. In particular, each user 30 provides a set of authentication factors which is evaluated to determine whether that user 30 is legitimate or a fraudster. By way of example, the set of authentication factors includes a phrase-derived password 40 which is entered via the user interface of the user's client device 22. Other authentication factors may be required with the phrase-derived password 40 to further strengthen security such as biometrics, cookies, one-time passcodes (OTPs), personal identification numbers (PINs), and so on. Moreover, as mentioned earlier, other forms of authentication may be employed such as risk-based or adaptive authentication to authenticate based on measures of risk, multi-factor authentication, step-up authentication, combinations thereof, and so on.

Additionally, the computerized resources may reside locally on the client devices 22 themselves (e.g., local single sign-on, access to locally installed apps, data, network environments, etc.). Additionally, such computerized resources may reside remotely on one or more remote protected resource servers 26 (e.g., remote single sign-on, access to remote apps, remote data, remote environments, etc.). Suitable computerized resources include user screen access, phone access, camera access, wireless network access, content (e.g., documents, files, email, database entries, movies, music, other types of visual and/or audio media, general information, games, etc.), services (e.g., banking transactions, securities trading, online ordering and purchasing, etc.), VPN access, application access, permissions and/or privileges, encryption, the ability to perform or complete other operations, other accessible computerized resources, combinations thereof, and so on.

As will be explained in further detail shortly, each client device 22 is equipped with a suitable user interface that enables each user 30 to generate a respective phrase-derived password 40, and then to access one or more resources using that phrase-derived password 40. As shown in FIG. 1, the user 30(1) generates a password 40(1) based on a provided phrase 42(1), the user 30(2) generates a password 40(2) based on a provided phrase 42(2), and so on.

It should be understood that the phrase-derived passwords 40 include multiple words that may be unrelated to each other (e.g., four unrelated words). Accordingly, an attacker would be unsuccessful in overcoming the security by simply trying each word from a dictionary, or each word with well-known metacharacter substitutions. Rather, it would take an excessively long time to try different combinations of words from a dictionary to overcome security. As a result, the phrase-derived passwords 40 are not easily guessable and thus provide improved strength over simple words and statements. Moreover, the users 30 are able to remember the passwords 40 because the users 30 supplied the original phrases from which the passwords 40 were derived. Further details will now be provided with reference to FIG. 2.

Figure 2:
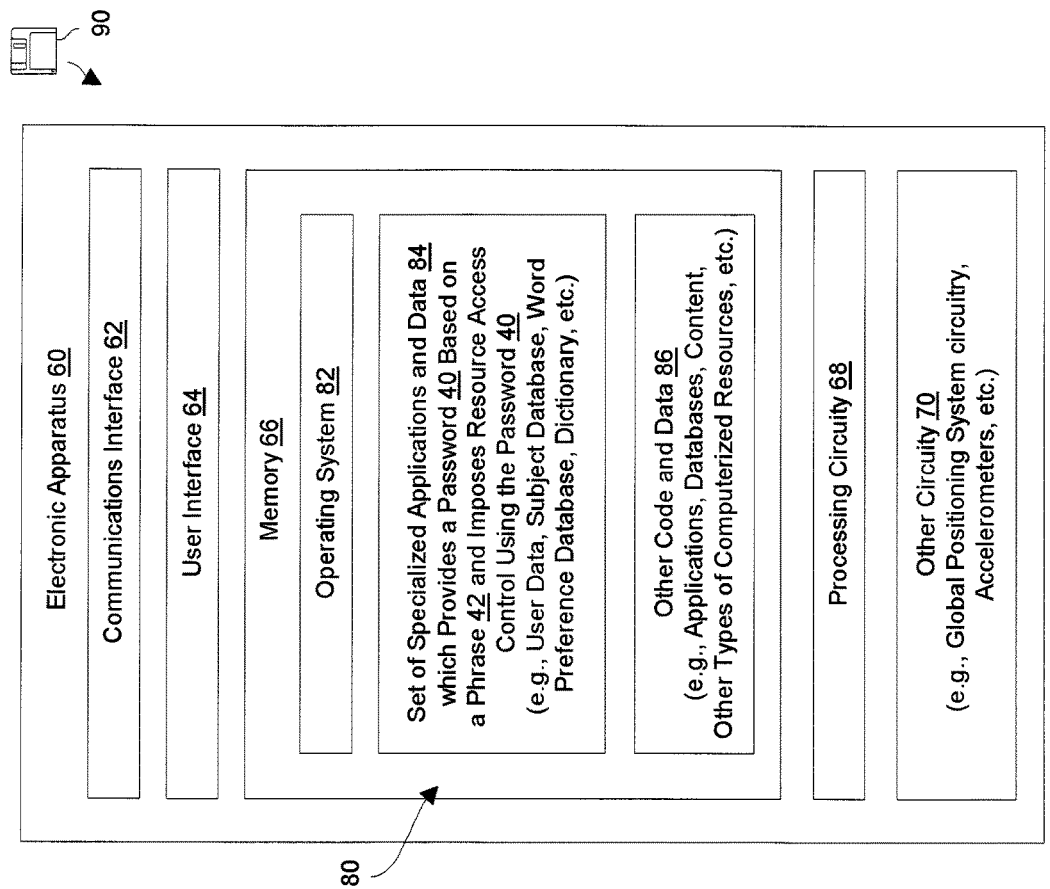
FIG. 2 is a block diagram of an apparatus of the electronic environment of FIG. 1.

FIG. 2 shows particular details of an electronic apparatus 60 of the electronic environment 20. The electronic apparatus 60 is constructed and arranged to provide access control using a password 40 derived from a phrase 42 provided by a user 30, and may reside anywhere within the electronic environment 20 such as by forming part (or all) of a client device 22, of the remote authentication server 24, or of a remote protected resource server 26 (also see FIG. 1). The electronic apparatus 60 includes a communications interface 62, a user interface 64, memory 66, processing circuitry 68, and other circuitry 70.

The communications interface 62 is constructed and arranged to connect the electronic apparatus 60 to the communications medium 28 (FIG. 1). Accordingly, the communications interface 62 enables the electronic apparatus 60 to communicate with the other components of the electronic environment 20. Such communications may be cable-based or wireless (i.e., IP-based, SAN-based, cellular, Bluetooth, combinations thereof, and so on).

The user interface 64 is constructed and arranged to receive input from a user 30 and provide output to the user 30. In some arrangements, the user interface 64 is formed by multiple specialized I/O components such as a keyboard, a pointing device (e.g., a mouse, a trackball, etc.), and a computer monitor. In other arrangements, the user interface 64 is more integrated such as a touch screen, a miniature screen and keypad, and so on.

The memory 66 is intended to represent both volatile storage (e.g., DRAM, SRAM, etc.) and non-volatile storage (e.g., flash memory, magnetic disk drives, etc.). The memory 66 stores a variety of software constructs 80 including an operating system 82, a set of specialized applications and data 84, and other code/data 86.

The processing circuitry 68 is constructed and arranged to operate in accordance with the various software constructs 80 stored in the memory 66. In particular, the processing circuitry 68, when executing the operating system 82, manages various parts of the electronic apparatus 60 (e.g., memory allocation, processor cycles, etc.). Additionally, the processing circuitry 68, when operating in accordance with the set of specialized applications and data 84, forms specialized circuitry which provides a password 40 based on a phrase 42 provided by a user 30, and controls computerized resource access via the password 40. Furthermore, the other code and data 86 represents various types of information/resources such as other applications (or apps), databases, content, utilities, parameters, combinations thereof, and other types of computerized resources, etc.

It should be understood that the above-mentioned specialized circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software to the electronic apparatus 60. The computer program product 90 has a non-transitory and non-volatile computer readable medium which stores a set of instructions to control one or more operations of the electronic apparatus 60. Examples of suitable computer readable storage media include tangible articles of manufacture and apparatus which store instructions in a non-volatile manner such as CD-ROM, DVD, flash memory, disk memory, tape memory, and the like.

The other circuitry 70 represents additional specialized componentry of the electronic apparatus 60. For example, when the electronic apparatus 60 forms at least part of a client device 22 such as a smart phone, the other circuitry 70 may include a camera, GPS circuitry, cellular telephone circuitry, and so on. As another example, when the electronic apparatus 60 forms at least part of a remote resource server 26, the other circuitry 70 may include a backup or archiving system, specialized I/O modules and equipment, etc.

At this point, it should be understood that the set of specialized applications and data 84 may include user data (e.g., specific user information if the electronic apparatus 60 is a client device 22, a user database if the electronic apparatus 60 forms part of the authentication server 24, etc.), a subject database, a word preference database, a dictionary, and so on. As will be explained in further detail short, the subject database includes a variety of subjects thus enabling the electronic apparatus 60 to randomly present a subject to the user 30 to inspire the user 30 to enter a phrase 42 perhaps about the subject. Also, as will be explained in further detail short, the word preference database includes words which are common and/or uncommon thus enabling the electronic apparatus 60 to select phrase words which are well suited for altering and for password generation. Further details will now be provided with reference to FIGS. 3 and 4.

Figure 3:
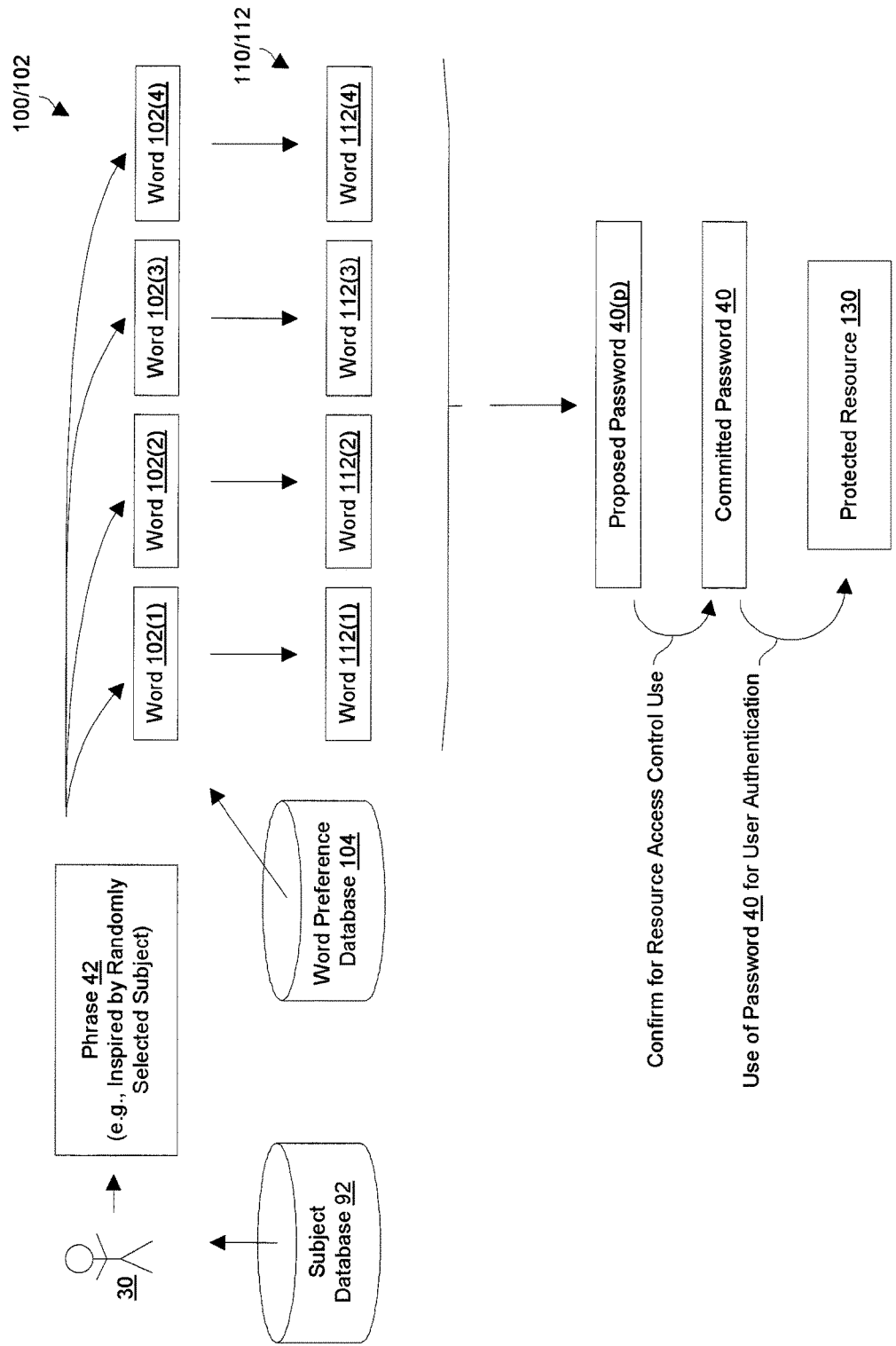
FIG. 3 is a block diagram illustrating particular operating details of electronic environment of FIG. 1.
Figure 4:
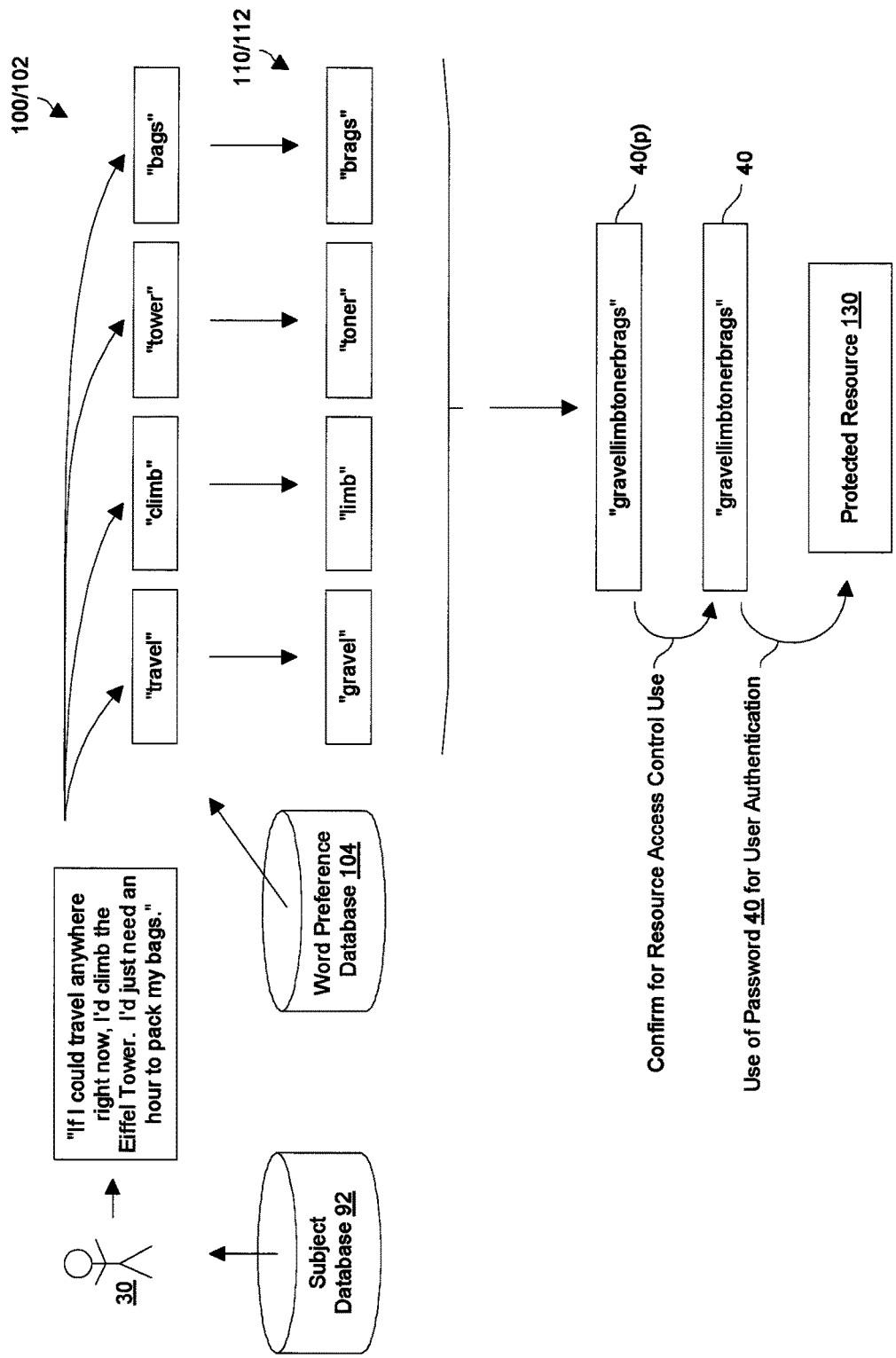
FIG. 4 is a block diagram illustrating an example operation performed by the electronic environment of FIG. 1.

FIGS. 3 and 4 show particular details when the electronic apparatus 60 is in operation. FIG. 3 shows a process of (i) deriving a password 40 based on a phrase 42 provided by a user 30, (ii) confirming with the user 30 that the password 40 is to control access to a resource, and (iii) using the password 40 for resource access control. FIG. 4 shows an example operation for deriving the password 40 and confirming with the user 30 that the password 40 is to control access to a resource.

First, the user 30 informs the electronic apparatus 60 that the user 30 wishes to configure the electronic apparatus 60 for user authentication which uses a phrase-derived password 40. Recall that the electronic apparatus 60 may form part of the user's client device 22, the remote authentication server 24, or a remote resource server 26 (also see FIG. 1).

This configuration phase of the process may begin with user 30 operating the user interface 64 (FIG. 2). For example, this configuration phase may be triggered in response to a user command, an attempt by the user 30 to access a resource that is equipped with access control, during enrollment with a single sign-on service, and so on.

Initially, the electronic apparatus 60 prompts the user 30 to provide a phrase 42. The user 30 then responds to the prompt by providing a phrase 42 (see FIG. 3). The phrase 42 should include at least a predefined number of words (e.g., a minimum of at least 10 words, at least 12 words, etc.) and include words that are not simply articles and pronouns.

In some arrangements, the electronic apparatus 60 inspires the user 30 to type in a phrase 42 by presenting a particular subject which is randomly selected from a subject database 92. For example, the electronic apparatus 60 may suggest topics or ask questions such as "how is the weather today?" or "what would you like to eat now?" or "where would you like to travel?" As another example, the electronic apparatus 60 may display a picture of a city or an event, and ask "what does this make you think of?" There are a variety of other suitable ways to elicit the user 30 to enter a phrase 42.

In response to receipt of the phrase 42, the electronic apparatus 60 parses the phrase 42 into a group 100 of individual words 102(1), 102(2), . . . (collectively, individual words 102) and selects a predefined number of the words 102 for use in password generation. In particular, the electronic apparatus 60 imposes a preference for proper nouns, uncommon nouns/verbs/adjectives/etc. rather than common words. That is, the electronic apparatus 60 attempts to avoid frequently used words such as "that", thing", "car", etc.

In some arrangements, the electronic apparatus 60 performs additional processing of the words 102 such as ignoring capitalization, numbers, punctuations, etc. In some arrangements, the electronic apparatus 60 compares each word 102 to word preference database 104 (e.g., a table of common words, a table of uncommon words, etc.) and provides a score or weight to each word 102 in order to rank each word 102 and thus identify the least common words 102 from the phrase 42. In these arrangements, the electronic apparatus 60 then selects the lease common words 102 for use in password generation.

In some arrangements, the electronic apparatus 60 chooses four words from the phrase 42. It should be understood that the electronic apparatus 60 picks a different number of words in other arrangements (e.g., three, five, etc.).

If the electronic apparatus 60 does not find enough suitable words 102 in the phrase 42 provided by the user 30, the electronic apparatus 60 re-prompts the user 30 to enter another phrase 42. Similarly, if the user 30 has difficulty creating a phrase 42 with enough words 102, the user 30 can direct the electronic apparatus 60 to randomly provide a new subject (e.g., a new question, a new picture, etc.) from the subject database 92 to inspire the user 30 to conceive of a new/longer/richer phrase 42.

Next, the electronic apparatus 60 adjusts the words 102 in the group 100 to form a new group 110 of new words 112(1), 112(2), . . . (collectively, words 112). In some arrangements, the electronic apparatus 60 simply modifies one letter such as by replacing a letter with another letter, deleting a letter, adding a letter, etc. (e.g., by changing the word "patio" to the word "ratio"). In another arrangement, the electronic apparatus 60 replaces the original words 102 with similar words 112 such as replacing the original words 102 with new words 112 that rhyme with the original words 102, etc. (e.g., by changing the word "heart" to the word "chart"). Preferably, the new words 112 that are formed from the original words 102 are real dictionary words.

Once the electronic apparatus 60 has generated the new group 110 of words 112, the electronic apparatus 60 concatenates the words 112 together into a proposed password 40($p$), i.e., a long single string of characters, and displays this resulting concatenation to the user 30. Optionally, the character string includes spaces between the words 112. In some arrangements, the electronic apparatus 60 provides the words 112 in a particular order (i.e., the order corresponding to the order of the original words 102 from which the words 112 were derived). In other arrangements, the electronic apparatus 60 permits the user 30 to move the words 112 around into a different order to form a new string of characters.

Once the user 30 is satisfied with the series of words 112, the user 30 informs the electronic apparatus 60 that the user 30 has selected the series of words 112 as the user's password 40. That is, the user 30 commits to using the series as the user's password 40. As a result, the password 40 which has been derived from the user's phrase 42 is now ready for use to authenticate the user 30 to control access to a protected resource 130. Otherwise, the user 30 is free to repeat the process to generate a new phrase-derived password 40.

Accordingly, before the user is able to access the resource 130, the user must answer a query from the electronic apparatus 60 by correctly providing the phrase-derived password 40. It should be understood that when the user 30 successfully authenticates using the password 40, the electronic apparatus 60 grants the user 30 with access to the resource 130. However, when user authentication is unsuccessful, the electronic apparatus 60 denies access to the resource 130.

FIG. 4 shows an example of the above-described process. As shown in FIG. 4, the user 30 writes, as the phrase 42, "If I could travel anywhere right now, I'd climb the Eiffel Tower". In this example, the user 30 may have responded to a simple prompt from the subject database 92 such as an instruction (e.g., "Please enter a phrase:") or a more complex prompt such as an open-ended or general question (e.g., "Where do you want to be?"). Other thought-provoking material may be provided by the subject database 92 as well such as symbols, images, pictures, videos, sounds, combinations thereof, etc.

It should be understood that the term "phrase" within this document means a coherent sequence of words that expresses a particular thought, idea or the like. The phrase 42 should be at least several words in length (e.g., at least 10, at least 12, etc.). The phrase 42 may be an incomplete sentence, an entire sentence, or multiple sentences. In these situations, the user 30 will nevertheless remember the phrase (or thought) 42 and thus be able to remember the password 40. Perhaps, the user 30 will also remember the seed subject which will then trigger the user to remember the phrase 42, and so on.

In response to the phrase 42, the electronic apparatus 60 parses the phrase 42 into a group 100 of individual words 102 and identifies the least common words 102 in the group 100. In the example, the electronic apparatus 60 selects, as the four least common words 102, "travel", "climb", "tower", and "bags". In this example, the other words such as "if", "I", and "the" are not selected because they are either too short, pronouns, articles, etc. Also, in this example, the other words such as "could", "right", and "anywhere" are not selected because they are more common than the selected words based on scoring using the word preference database 104.

Subsequently, the electronic apparatus 60 adjusts the words 102 in the group 100 to form a new group 110 of new words 112(1), 112(2), . . . (collectively, words 112). In particular, the electronic apparatus 60 evaluates whether the words 102 can be modified by changing a letter, deleting a letter, adding a letter, etc. to form new dictionary words 112. Here, the electronic apparatus 60 changes "travel" to "gravel" (by switching a letter). Additionally, the electronic apparatus 60 changes "climb" to "limb" (by deleting a letter). Furthermore, the electronic apparatus 60 changes "tower" to "toner" (by switching a letter). Also, the electronic apparatus 60 changes "bags" to "brags" (by adding a letter).

In some arrangements, in the new group 110, there may be multiple candidate words 112 that are generated by adjusting a single letter and the electronic apparatus 60 presents the multiple candidate words 112 to the user 30. The user then selects one of the candidate words 112. For example, by changing just one letter, "tower" could be changed to "toner", "towel", "lower", and so on.

Next, the electronic apparatus 60 concatenates the words 112 together into a proposed password 40(p), i.e., a long single string of characters, and displays this resulting concatenation to the user 30. Accordingly, the electronic apparatus 60 offers the string "gravellimbtonerbrags" as the password 40(p). In some arrangements, the electronic apparatus offers the string with the words 112 separated by spaces, e.g., "gravel limb toner brags".

In some arrangements, the user 30 is able to move the words 112 into a different order or sequence, e.g., "limb gravel toner brags". Such operation does not compromise security but may make it easier for the user to remember the password 40.

If the user 30 is satisfied with the series of words 112, the user 30 informs the electronic apparatus 60 that the user 30 has selected the series of words as the user's password 40. That is, the user 30 commits to using the series as the user's password 40. Accordingly, the password 40 which has been derived from the user's phrase 42 is now ready for use to authenticate the user 30 to control access to a protected resource 130. Otherwise, the user 30 is free to repeat the process to generate a new phrase-derived password 40.

It should be understood that the password 40 is stronger than a single word or statement. Moreover, the user 30 easily remembers the password 40 because the user 30 can remember the original phrase 42 from which the password 40 is based. When the user successfully authenticates using the password 40, the electronic apparatus 60 grants the user 30 with access to the resource 130 (e.g., single sign-on, content, a service, the ability to complete a transaction, etc.). However, when user authentication is unsuccessful, the electronic apparatus 60 denies access to the resource 130. Further details will now be provided with reference to FIG. 5.

Figure 5:
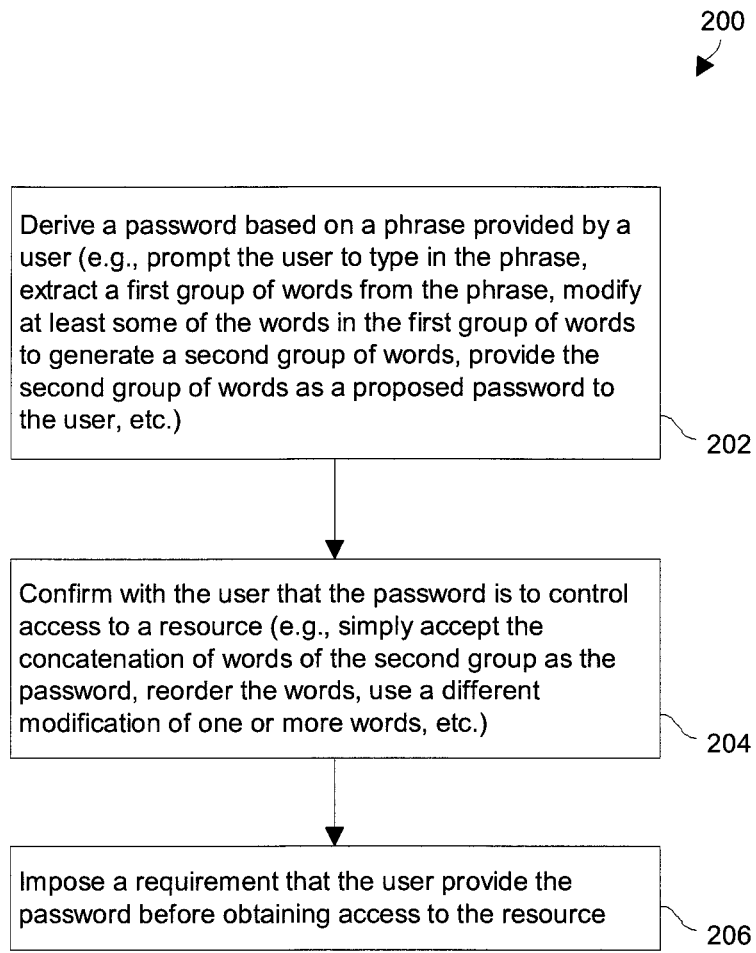
FIG. 5 is a flowchart of a procedure which is performed by the electronic environment of FIG. 1.

FIG. 5 shows a procedure 200 which is performed by the electronic apparatus 60 to control access to a resource. Recall that the processing circuitry 68, when operating in accordance with the set of applications and data 84, forms specialized circuitry which performs such a procedure 200 (also see FIG. 2).

At 202, the electronic apparatus 60 derives a password based on a phrase provided by a user. Along these lines, the electronic apparatus 60 prompts the user to type in the phrase, extracts a first group of words from the phrase (e.g., by picking the least common words from the phrase), modifies at least some of the words in the first group of words extracted from the phrase to generate a second group of words, and provides the second group of words to the user. The second group of words, in a particular sequence, forms a proposed password.

As mentioned earlier, the electronic apparatus 60 may provide the user with a particular subject to help inspire the user 30 to write a phrase 42. Such a subject may be selected randomly from a subject database (e.g., see the set of applications and data 84 in FIG. 2).

Also, as mentioned earlier, the electronic apparatus 60 may utilize a word preference database to identify common and less common words in the phrase 42. In some arrangements, the electronic apparatus 60 filters, ranks, and/or scores the words in the phrase 42 when selecting the words from the phrase 42.

At 204, the electronic apparatus 60 confirms with the user that the proposed password is to control access to the resource. Here, the user may simply accept the concatenation of words in the second group as the password. Alternatively, the user may reorder the words of the second group. As yet another alternative, the user may select other modified versions of one or more words, and so on. If the user is not satisfied with the password, the user may repeat 202 and 204 to generate a new password.

At 206, the electronic apparatus 60, after confirming with the user that the password is to control access to the resource, imposes a requirement that the user provide the password before obtaining access to the resource. Here, the electronic apparatus 60 performs authentication operations by at least requiring the user to provide the password to successfully authenticate. If authentication of the user is successful (i.e., if the electronic apparatus 60 considers the user to be authentic), the electronic apparatus 60 grants the user with access to the resource. However, if authentication is unsuccessful, the electronic apparatus 60 denies the user access to the resource.

As described above, improved techniques are directed to access control using passwords 40 derived from phrases or thoughts 42 provided by users 30. In particular, such a phrase 42 from a user 30 may operate as a source of multiple words 102 from which a password 40 is generated. For example, four words 102 can be selected from the phrase 42 and four alternative words 112 can be derived from the original four words 102. The four alternative words 112 can then be concatenated to form the password 40. Such a password 40 is relatively strong since the resulting concatenation would not be found as a single entry in any dictionary, and since it would be an extremely difficult endeavor to predict such a password 40 by attempting to combine words from a dictionary to form the concatenations. Moreover, such a password 40 would not be difficult for the user 30 to remember since the user 30 provided the original phrase or thought 42 from which the password 40 was derived.

One should appreciate that the above-described techniques do not merely implement a password or authentication. Rather, the disclosed techniques involve providing an improvement to the technology of access control by imposing a stronger password made of several words (e.g., four) in a manner that enables a user 30 to easily remember the password. With such techniques, other advantages are available as well such as enabling the words of the password to be unrelated to each other (due to changing letters of the original words from the phrase), making the password less predictable, minimizing user lockouts caused by the user forgetting the user's password, preventing a malicious person from overcoming security by simply trying an entry from a dictionary, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 such as the servers 24, 26 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

Additionally, in some arrangements, the electronic apparatus 60 may impose additional constraints on the passwords 40. For example, the electronic apparatus 60 may require the overall length of the password 40 to be at least a certain number of letters such as 12, 16, 17, and so on. Additionally, the electronic apparatus 60 may require the password 40 to include other symbols such as at least one number, at least one metacharacter, and so on. Such modifications and enhancements are intended to belong to various embodiments of the disclosure.

What is claimed is:

1. A method of controlling access to a resource, the method comprising:
   deriving, by processing circuitry, a password based on a phrase provided by a user;
   by the processing circuitry, confirming with the user that the password is to control access to the resource; and
   after confirming with the user that the password is to control access to the resource, imposing, by the processing circuitry, a requirement that the user provide the password before obtaining access to the resource;
   wherein deriving the password based on the phrase provided by the user includes:
   prompting the user to type in the phrase,
   extracting a first group of words from the phrase,
   modifying at least some of the words in the first group of words extracted from the phrase to generate a second group of words, and
   providing the second group of words to the user; and
   wherein providing the second group of words to the user for password use includes:
   displaying, as a proposal for the password, each word of the second group of words on an electronic display to the user, the proposal for the password including at least 16 letters.

2. The method as in claim 1 wherein prompting the user to type in the phrase includes:
   instructing the user to write, as the phrase, an expression regarding a particular subject.

3. The method as in claim 2 wherein prompting the user to type in the phrase further includes:

prior to instructing the user to write the expression, randomly selecting the particular subject from multiple subjects in a subject database, and presenting the particular subject on the electronic display to the user.

4. The method as in claim 1 wherein extracting the first group of words from the phrase includes:

parsing the phrase into individual words, and selecting, as the first group of words, less than all of the individual words parsed from the phrase.

5. The method as in claim 4 wherein selecting less that all of the individual words includes:

identifying, as the first group of words, a predefined number of uncommon words from the individual words parsed from the phrase.

6. The method as in claim 5 wherein identifying the predefined number of uncommon words from the individual words parsed from the phrase includes:

scoring each individual word parsed from the phrase based on a word preference database, and selecting, as the first group of words, four words from the individual words parsed from the phrase based on scoring each individual word.

7. The method as in claim 1 wherein modifying at least some of the words in the first group of words includes:

adjusting letters in words of the first group of words to form the second group of words.

8. The method as in claim 7 wherein adjusting the letters in the words of the first group of words includes:

for each word of the first group of words, making an adjustment to exactly one letter in that word to form a new word that is different from that word, the new word being included in the second group of words.

9. The method as in claim 7 wherein adjusting the letters in the words of the first group of words includes:

replacing exactly one letter with another letter in a particular word of the first group of words to form a particular word of the second group of words.

10. The method as in claim 7 wherein adjusting the letters in the words of the first group of words includes:

deleting exactly one letter from a particular word of the first group of words to form a particular word of the second group of words.

11. The method as in claim 7 wherein adjusting the letters in the words of the first group of words includes:

adding exactly one letter to a particular word of the first group of words to form a particular word of the second group of words.

12. The method as in claim 1 wherein displaying each word of the second group of words includes:

presenting, on the electronic display to the user, a concatenated string of letters, the concatenated string including each word of the second group of words.

13. The method as in claim 1 wherein confirming with the user that the password is to control access to the resource includes:

prompting the user to approve the password as an authentication factor for authentication of the user and, in response, receiving an electronic signal approving the password as an authentication factor for authentication of the user.

14. The method as in claim 13 wherein imposing the requirement that the user provide the password before obtaining access to the resource includes:

querying the user for the password and, in response, receiving input from the user, performing an authentication operation based on the input from the user, granting resource access to the user when a result of the authentication operation indicates that the user is authentic, and denying resource access to the user when the result of the authentication operation does not indicate that the user is authentic.

15. The method as in claim 1 wherein each word of the second group of words includes multiple letters; and wherein displaying each word of the second group of words on the electronic display includes rendering the multiple letters of each word to the user.

16. Electronic circuitry that controls access to a resource, the electronic circuitry comprising:

memory; and control circuitry coupled to the memory, the memory storing instructions which, when carried out by the control circuitry, cause the control circuitry to:

derive a password based on a phrase provided by a user, confirm with the user that the password is to control access to the resource, and after confirming with the user that the password is to control access to the resource, impose a requirement that the user provide the password before obtaining access to the resource;

wherein the control circuitry, when deriving the password based on the phrase provided by the user, is constructed and arranged to:

prompt the user to type in the phrase, extract a first group of words from the phrase, modify at least some of the words in the first group of words extracted from the phrase to generate a second group of words, and provide the second group of words to the user; and wherein the control circuitry, when providing the second group of words to the user for password use, is constructed and arranged to:

display, as a proposal for the password, each word of the second group of words on an electronic display to the user, the proposal for the password including at least 16 letters.

17. The electronic circuitry as in claim 16 wherein the control circuitry, when extracting the first group of words from the phrase, is constructed and arranged to:

parse the phrase into individual words, and select, as the first group of words, less than all of the individual words parsed from the phrase; and wherein the control circuitry, when modifying at least some of the words in the first group of words, is constructed and arranged to:

adjust letters in words of the first group of words to form the second group of words.

18. The electronic circuitry as in claim 17 wherein the control circuitry, when prompting the user to type in the phrase, is constructed and arranged to:

randomly select a particular subject from multiple subjects in a subject database, present the particular subject on the electronic display to the user, and instruct the user to write, as the phrase, an expression regarding a particular subject.

19. The electronic circuitry as in claim 16 wherein each word of the second group of words includes multiple letters; and wherein the control circuitry, when displaying each word of the second group of words on the electronic display, is constructed and arranged to render the multiple letters of each word to the user.

20. A computer program product having a non-transitory computer readable medium which stores a set of instructions to control access to a resource; the set of instructions, when carried out by computerized circuitry, causing the computerized circuitry to perform a method of:

deriving a password based on a phrase provided by a user;

confirming with the user that the password is to control access to the resource; and after confirming with the user that the password is to control access to the resource, imposing a requirement that the user provide the password before obtaining access to the resource;

wherein deriving the password based on the phrase provided by the user includes:

prompting the user to type in the phrase, extracting a first group of words from the phrase, modifying at least some of the words in the first group of words extracted from the phrase to generate a second group of words, and providing the second group of words to the user;

wherein extracting the first group of words from the phrase includes:

parsing the phrase into individual words, and selecting, as the first group of words, less than all of the individual words parsed from the phrase;

wherein modifying at least some of the words in the first group of words includes:

adjusting letters in words of the first group of words to form the second group of words;

wherein providing the second group of words to the user for password use includes:

displaying, as a proposal for the password, each word of the second group of words on an electronic display to the user, the proposal for the password including at least 16 letters;

wherein confirming with the user that the password is to control access to the resource includes:

prompting the user to approve the password as an authentication factor for authentication of the user and, in response, receiving an electronic signal approving the password as an authentication factor for authentication of the user; and wherein imposing the requirement that the user provide the password before obtaining access to the resource includes:

querying the user for the password and, in response, receiving input from the user, performing an authentication operation based on the input from the user, granting resource access to the user when a result of the authentication operation indicates that the user is authentic, and denying resource access to the user when the result of the authentication operation does not indicate that the user is authentic.

\* \* \* \* \*